United States Patent
Tamura (10) Patent No.: US 11,293,518 B2
(45) Date of Patent: Apr. 5, 2022

(54) TOOTHED BELT

(71) Applicant: Mitsuboshi Belting Ltd., Kobe (JP)

(72) Inventor: Eiki Tamura, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 331 days.

(21) Appl. No.: 16/603,770

(22) PCT Filed: Apr. 23, 2018

(86) PCT No.: PCT/JP2018/016500
§ 371 (c)(1),
(2) Date: Oct. 8, 2019

(87) PCT Pub. No.: WO2018/199043
PCT Pub. Date: Nov. 1, 2018

(65) Prior Publication Data
US 2020/0116230 A1    Apr. 16, 2020

(30) Foreign Application Priority Data

Apr. 24, 2017 (JP) .............................. JP2017-085025
Apr. 17, 2018 (JP) .............................. JP2018-079008

(51) Int. Cl.
*F16G 1/28* (2006.01)
*F16G 1/12* (2006.01)

(52) U.S. Cl.
CPC ...... *F16G 1/28* (2013.01); *F16G 1/12* (2013.01)

(58) Field of Classification Search
CPC .................................. F16G 1/28; F16G 5/20
USPC ................................................. 474/205, 260
See application file for complete search history.

(56) References Cited

U.S. PATENT DOCUMENTS

| 3,756,091 A * | 9/1973 | Miller .................. F16G 1/28 474/153 |
| 3,977,265 A * | 8/1976 | Worley .................. F16G 1/28 474/153 |
| 4,108,011 A * | 8/1978 | Gregg .................. F16G 1/28 474/153 |

(Continued)

FOREIGN PATENT DOCUMENTS

| CN | 106233036 A | 12/2016 |
| GB | 1558766 A | 1/1980 |

(Continued)

OTHER PUBLICATIONS

Sep. 15, 2020—(JP) Notification of Reasons for Refusal—App 2018-079008, Eng Tran.

(Continued)

*Primary Examiner* — Henry Y Liu
(74) *Attorney, Agent, or Firm* — Banner & Witcoff, Ltd.

(57) ABSTRACT

Provided is a toothed belt comprising: a belt body that includes a plurality of core wires; a back surface part in which the plurality of core wires are embedded; and a plurality of teeth that oppose the back surface in a belt thickness direction. The back surface part and the plurality of teeth are integrally molded using a thermoplastic elastomer. The toothed belt is characterized in that: a belt strength per 1 mm of belt width is at least 1.85 kN; a pitch of the plurality of teeth is at least 20 mm; the height of each of the plurality of teeth is at least 5 mm; and the thickness of the back surface part is at least 4 mm.

5 Claims, 5 Drawing Sheets

(56) References Cited

U.S. PATENT DOCUMENTS

| | | | | |
|---|---|---|---|---|
| 4,416,649 A * | 11/1983 | Kohrn | B29D 29/08 | 156/138 |
| 4,427,403 A * | 1/1984 | Kanamori | F16G 1/28 | 474/153 |
| 4,512,834 A * | 4/1985 | Kohrn | F16G 1/28 | 156/138 |
| 4,514,179 A * | 4/1985 | Skura | B29D 29/08 | 474/204 |
| 4,775,357 A * | 10/1988 | Wolfe | F16G 1/28 | 474/205 |
| 4,838,843 A * | 6/1989 | Westhoff | B29D 29/08 | 474/205 |
| 4,934,992 A * | 6/1990 | Simon | F16G 5/20 | 474/268 |
| 5,112,282 A * | 5/1992 | Patterson | F16G 5/20 | 474/260 |
| 5,173,361 A * | 12/1992 | Yamashita | F16G 1/12 | 152/526 |
| 5,254,049 A * | 10/1993 | Gregg | F16G 1/28 | 474/205 |
| 5,284,456 A * | 2/1994 | Connell | F16G 5/20 | 474/91 |
| 5,322,479 A * | 6/1994 | Le Devehat | F16G 1/28 | 474/101 |
| 5,362,281 A * | 11/1994 | Dutton | F16G 1/28 | 474/205 |
| 5,536,213 A * | 7/1996 | Macchiarulo | F16F 15/26 | 474/205 |
| 5,545,097 A * | 8/1996 | Kitazumi | F16G 1/28 | 474/266 |
| 5,741,198 A * | 4/1998 | Fujiwara | C08K 5/39 | 474/271 |
| 5,784,874 A * | 7/1998 | Bruyneel | D07B 1/0613 | 57/237 |
| 5,807,194 A * | 9/1998 | Knutson | F16G 1/28 | 474/268 |
| 5,876,297 A * | 3/1999 | Takeuchi | F16G 1/28 | 474/202 |
| 5,954,606 A * | 9/1999 | Mishima | F16G 5/08 | 474/267 |
| 6,007,897 A * | 12/1999 | Tamaki | F16G 1/28 | 428/172 |
| 6,086,809 A * | 7/2000 | Goto | B29D 29/08 | 156/138 |
| 6,220,983 B1 * | 4/2001 | Osako | D02G 3/18 | 474/205 |
| 6,296,588 B1 * | 10/2001 | Ciemniecki | B29D 29/08 | 474/268 |
| 6,311,466 B1 * | 11/2001 | De Vos | D07B 7/025 | 57/212 |
| 6,358,171 B1 * | 3/2002 | Whitfield | F16G 5/20 | 474/266 |
| 6,375,590 B1 * | 4/2002 | Tomobuchi | F16G 1/28 | 474/263 |
| 6,406,397 B1 * | 6/2002 | Isshiki | B29D 29/08 | 474/205 |
| 6,412,263 B1 * | 7/2002 | Lee | D07B 7/025 | 57/210 |
| 6,770,004 B1 * | 8/2004 | Lofgren | F16G 1/00 | 474/264 |
| 7,056,249 B1 * | 6/2006 | Osako | F16G 1/06 | 474/260 |
| 7,781,528 B2 * | 8/2010 | Takehara | F16G 1/28 | 525/194 |
| 2002/0042317 A1 * | 4/2002 | South | F16G 5/06 | 474/264 |
| 2002/0062636 A1 | 5/2002 | De Vos et al. | | |
| 2002/0132692 A1 * | 9/2002 | Knutson | F16G 1/28 | 474/263 |
| 2003/0004025 A1 * | 1/2003 | Okuno | F16G 5/166 | 474/260 |
| 2003/0078125 A1 * | 4/2003 | Knutson | F16G 1/10 | 474/260 |
| 2003/0083168 A1 * | 5/2003 | Cipollone | F16G 1/28 | 474/260 |
| 2003/0130077 A1 * | 7/2003 | Knutson | F16G 1/28 | 474/260 |
| 2003/0211912 A1 * | 11/2003 | Cesare | F16G 1/28 | 474/260 |
| 2004/0214675 A1 * | 10/2004 | Beck | F16G 5/166 | 474/260 |
| 2005/0014591 A1 * | 1/2005 | Arai | F16G 1/28 | 474/237 |
| 2005/0113200 A1 * | 5/2005 | Okuno | F16G 5/166 | 474/266 |
| 2005/0215372 A1 * | 9/2005 | Wood | F16G 1/16 | 474/205 |
| 2006/0084543 A1 * | 4/2006 | Billups | F16G 1/28 | 474/237 |
| 2006/0154766 A1 * | 7/2006 | Lacy | F16H 55/36 | 474/148 |
| 2006/0264289 A1 * | 11/2006 | Ballhausen | F16G 1/28 | 474/263 |
| 2007/0111834 A1 * | 5/2007 | Matsuda | F16G 1/28 | 474/202 |
| 2007/0232429 A1 * | 10/2007 | Knox | F16G 1/28 | 474/205 |
| 2007/0259746 A1 * | 11/2007 | Wu | F16G 5/08 | 474/260 |
| 2008/0032837 A1 * | 2/2008 | Unruh | F16G 1/28 | 474/143 |
| 2008/0103001 A1 * | 5/2008 | Lofgren | F16G 1/28 | 474/237 |
| 2008/0108466 A1 * | 5/2008 | Pelton | D04B 1/102 | 474/250 |
| 2008/0132370 A1 * | 6/2008 | Goettsch | F16G 5/20 | 474/268 |
| 2009/0227406 A1 * | 9/2009 | Wu | C08G 18/12 | 474/238 |
| 2009/0275433 A1 * | 11/2009 | Gaynor | F16H 55/171 | 474/153 |
| 2010/0197435 A1 * | 8/2010 | Gewald | B65G 15/34 | 474/263 |
| 2011/0111902 A1 * | 5/2011 | Well | C08K 7/02 | 474/205 |
| 2011/0118068 A1 * | 5/2011 | Mitsutomi | F16G 1/10 | 474/205 |
| 2011/0129647 A1 * | 6/2011 | Duke, Jr | C08G 18/4854 | 428/156 |
| 2011/0269589 A1 * | 11/2011 | Schleicher | F16G 5/20 | 474/205 |
| 2012/0142471 A1 * | 6/2012 | Gaska | F16G 1/28 | 474/205 |
| 2012/0238392 A1 * | 9/2012 | Serkh | F16H 7/023 | 475/182 |
| 2012/0309573 A1 * | 12/2012 | Well | F16G 1/28 | 474/205 |
| 2012/0329591 A1 * | 12/2012 | Goeser | D07B 1/165 | 474/238 |
| 2013/0040771 A1 * | 2/2013 | Well | F16G 1/28 | 474/205 |
| 2013/0059690 A1 * | 3/2013 | Di Cesare | F16G 1/08 | 474/205 |
| 2014/0080647 A1 * | 3/2014 | Sakamoto | C08L 63/00 | 474/205 |
| 2014/0206487 A1 * | 7/2014 | Tomobuchi | C08K 5/3415 | 474/205 |
| 2014/0243134 A1 * | 8/2014 | Kucharczyk | C08J 5/24 | 474/261 |
| 2014/0287862 A1 * | 9/2014 | Yamada | F16G 1/28 | 474/204 |
| 2015/0152941 A1 * | 6/2015 | Sekiguchi | F16G 1/10 | 474/148 |
| 2015/0246775 A1 * | 9/2015 | Suefuji | D07B 1/0633 | 198/847 |
| 2015/0259176 A1 * | 9/2015 | Goeser | F16G 1/28 | 428/189 |

(56) References Cited

U.S. PATENT DOCUMENTS

| | | | |
|---|---|---|---|
| 2016/0053850 A1* | 2/2016 | Brocke | F16G 5/08 474/205 |
| 2016/0084357 A1* | 3/2016 | Yuan | F16H 9/24 474/148 |
| 2016/0208889 A1* | 7/2016 | Yoshida | C08L 15/005 |
| 2017/0029578 A1* | 2/2017 | Wu | C08G 18/10 |
| 2017/0030431 A1* | 2/2017 | Duke, Jr | F16G 5/20 |
| 2017/0051810 A1* | 2/2017 | Ideguchi | F16G 1/00 |
| 2017/0082174 A1* | 3/2017 | Parziale | F16G 1/10 |
| 2017/0108079 A1* | 4/2017 | Shakushiro | F16G 1/28 |
| 2017/0191545 A1* | 7/2017 | Sekiguchi | C08G 18/10 |
| 2017/0248208 A1* | 8/2017 | Tamura | F16G 1/08 |
| 2018/0023663 A1* | 1/2018 | Speer | F16G 5/20 474/261 |
| 2018/0186185 A1* | 7/2018 | Fidan | B60C 9/2204 |

FOREIGN PATENT DOCUMENTS

| | | | |
|---|---|---|---|
| JP | 2000-346138 A | 12/2000 | |
| JP | 4439727 B2 | 3/2010 | |
| JP | 2010-096229 A | 4/2010 | |
| JP | 2011-163445 A | 8/2011 | |
| JP | 2014-142046 A | 8/2014 | |
| JP | 5825234 B2 | 12/2015 | |
| JP | 2016-090052 A | 5/2016 | |
| JP | 2016-211734 A | 12/2016 | |
| JP | 2007-120623 A | 5/2017 | |
| KR | 10-2005-0018407 A | 2/2005 | |
| WO | 2016/068296 A1 | 5/2016 | |
| WO | 2016-170788 A1 | 10/2016 | |

OTHER PUBLICATIONS

Sep. 25, 2020—(KR) Office Action—App 10-2019-7030959, Eng Tran.
Apr. 7, 2020—(JP) Notification of Reasons for Refusal—App 2018-079008, Eng Tran.
Jun. 2, 20214—(EP) Office Action—App 18790983.3.
Jul. 29, 2021—(CA) Office Action—App 3,053,234.
Aug. 3, 2020—(CN) Notification of First Office Action—App 201880017502.1, Eng Tran.
Jun. 16, 2020—(JP) Information Offer—App No. 2018-79008, Eng Tran.
Catalog of ContiTech (cover, p. 8, p. 9, and back cover) 2015 edition.
Catalog of Megadyne "Megaliner" (cover, p. 92, and back cover), Apr. 2017 edition.
Jul. 24, 2018—International Search Report—Intl App PCT/JP2018/016500.
Dec. 7, 2018—(TW) Office Action—App 107113913.
Apr. 29, 2019—(TW) Office Action—App 107113913.
Dec. 7, 2020—(EP) Extended Search Report—App 18790983.3.
Jan. 4, 2021—(CA) Office Action—App 3,053,234.

* cited by examiner

TOOTHED BELT

CROSS REFERENCE TO RELATED APPLICATIONS

This is a U.S. National Phase Application under 35 U.S.C. § 371 of International Application No. PCT/JP2018/016500, filed Apr. 23, 2018, which claims priority to Japanese Application Nos. 2017-085025, filed Apr. 24, 2017 and 2018-079008, filed Apr. 17, 2018, which was published Under PCT Article 21(2), the entire contents of which are incorporated herein by reference.

TECHNICAL FIELD

The present invention relates to a toothed belt containing a back portion and plural teeth integrally molded of a thermoplastic elastomer.

BACKGROUND ART

Toothed belts have been used broadly as motive power transmission belts in general industrial machines, agricultural machines, etc. and have come to be applied to heavy transport targets in recent years. For application to heavy transport targets, it is effective to increase the load-bearing capacity by increasing the overall size of a toothed belt (in particular, its tooth height). However, size reduction is also required from the viewpoint of machine installation space; in particular, it is desired to increase the load-bearing capacity while keeping the belt width.

As techniques for increasing the load-bearing capacity while keeping the belt width, a technique of arranging plural core wires in the belt thickness direction (refer to Patent documents 1 and 2); a technique of arranging core wires in the belt width direction densely without gaps; a technique of increasing the diameter of core wires; etc. have been known.

CITATION LIST

Patent Document

Patent document 1: JP-A-2014-142046
Patent document 2: JP-A-2016-211734

SUMMARY OF THE INVENTION

Problems that the Invention is to Solve

However, Patent documents 1 and 2 have no specific disclosure about the magnitude of belt strength, the structure (pitch and height) of teeth, etc. that are suitable for application to heavy transport targets.

An object of the present invention is to provide a toothed belt that can increase the load-bearing capacity while keeping the belt width and hence is suitable for application to heavy transport targets.

Means for Solving the Problems

The present invention provides a toothed belt including a belt body including plural core wires that extend in a belt longitudinal direction and are arranged in a belt width direction, a back portion in which the plural core wires are buried, and plural teeth that are opposite to the back portion in a belt thickness direction and arranged in the belt longitudinal direction so as to be spaced from each other, in which the back portion and the plural teeth are molded integrally of a thermoplastic elastomer, having: a belt strength per 1-mm belt width of higher than or equal to 1.85 kN; a pitch of the plural teeth of longer than or equal to 20 mm; a height of each of the plural teeth of greater than or equal to 5 mm; and a thickness of the back portion of larger than or equal to 4 mm.

As described later in Examples, the present invention can provide a toothed belt capable of increasing the load-bearing capacity while keeping the belt width and hence suitable for application to heavy transport targets.

In the present invention, each of the plural core wires may be constituted of a steel cord or a cord produced by twisting at least any of aramid fibers and carbon fibers.

Each of the plural core wires: may be constituted of a steel cord; may have a strength of 7 to 8 kN; and may have a diameter of 2.3 to 2.6 mm. In this case, since a steel cord having features of a low degree of elongation and high strength is used as the core wire, necessary increase of the belt strength per unit width can be realized in an even preferable manner.

The plural core wires: may have a pitch of 3.0 to 3.7 mm; and may have an interval between the plural core wires of 0.4 to 1.4 mm. In this case, as described later in Examples, necessary increase of the belt strength per unit width can be realized in an even preferable manner by employing a preferred combination of the pitch and the interval of the core wires.

The thermoplastic elastomer may be at least one selected from the group consisting of: a polyurethane thermoplastic elastomer; a polyester thermoplastic elastomer; a polystyrene thermoplastic elastomer; a polyolefin thermoplastic elastomer; a polyamide thermoplastic elastomer; and a vinyl chloride thermoplastic elastomer.

The thermoplastic elastomer may be a polyurethane thermoplastic elastomer and may have a hardness of 85 to 95°. In this case, a toothed belt that is superior in mechanical characteristics and durability can be obtained. Furthermore, since a polyurethane thermoplastic elastomer is used universally to form transmission belts and transport belts, toothed belts can be easily manufactured thereof. Still further, the type of polyurethane that constitutes the polyurethane thermoplastic elastomer may be polyether polyurethane, polyester polyurethane, or polycarbonate polyurethane.

Advantageous Effects of the Invention

The present invention can provide a toothed belt capable of increasing the load-bearing capacity while keeping the belt width and hence suitable for application to heavy transport targets.

MODE FOR CARRYING OUT THE INVENTION

Figure 1:
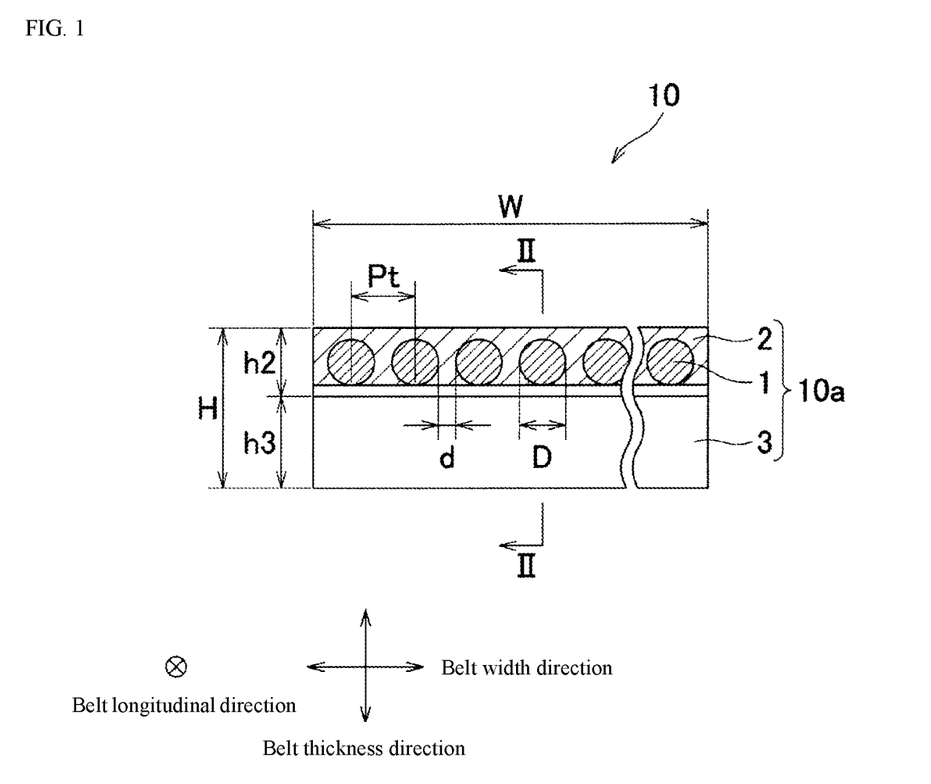
FIG. 1 is a sectional view, taken along the belt width direction (along line I-I in FIG. 2), illustrating a toothed belt according to an embodiment of the present invention.
Figure 2:
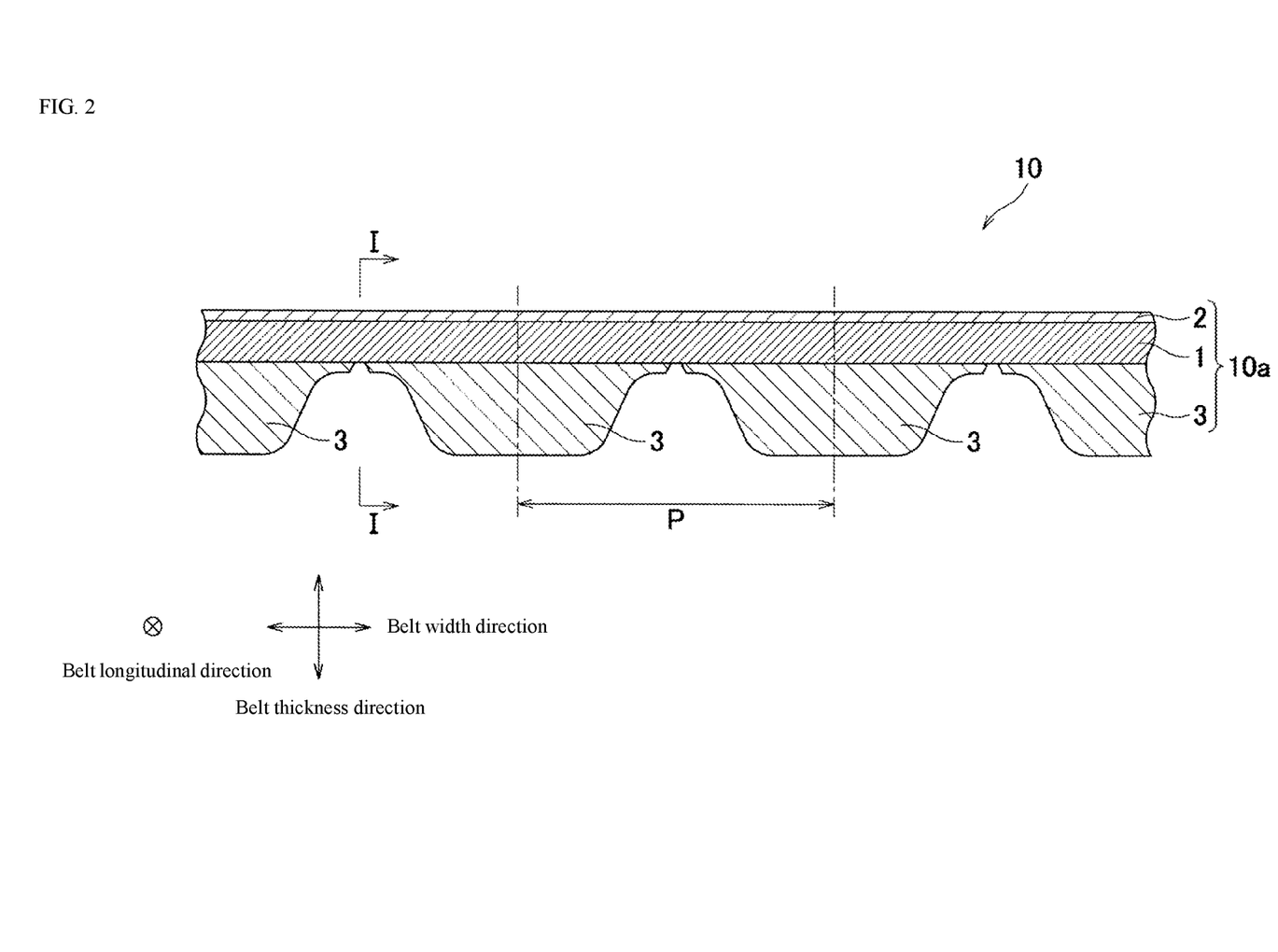
FIG. 2 is a sectional view, taken along the belt longitudinal direction (along line II-II in FIG. 1), illustrating the toothed belt according to the embodiment of the present invention.

As illustrated in FIG. 1 and FIG. 2, a toothed belt 10 according to an embodiment of the present invention includes a belt body 10a which includes plural core wires 1, a back portion 2 in which the plural core wires 1 are buried and plural teeth 3.

Core wire 1 employed in the present embodiment is constituted of a steel cord (a cord produced by twisting steel fibers together). The plural core wires 1 extend in the belt longitudinal direction and are arranged in the belt width direction.

The plural teeth 3 are opposite to the back portion 2 in the belt thickness direction and arranged in the belt longitudinal direction so as to be spaced from each other. The back portion 2 and the plural teeth 3 are molded integrally of a thermoplastic elastomer. In the present embodiment, the thermoplastic elastomer constituting the back portion 2 and the plural teeth 3 is a polyurethane thermoplastic elastomer that is 85 to 95° in hardness (measured by a type-A hardness meter according to JIS K6253: 2012). Example types of polyurethane that constitutes the polyurethane thermoplastic elastomer include polyether polyurethane, polyester polyurethane, and polycarbonate polyurethane.

It is preferable that the toothed belt 10 satisfies the following requirements.

Figure 3:
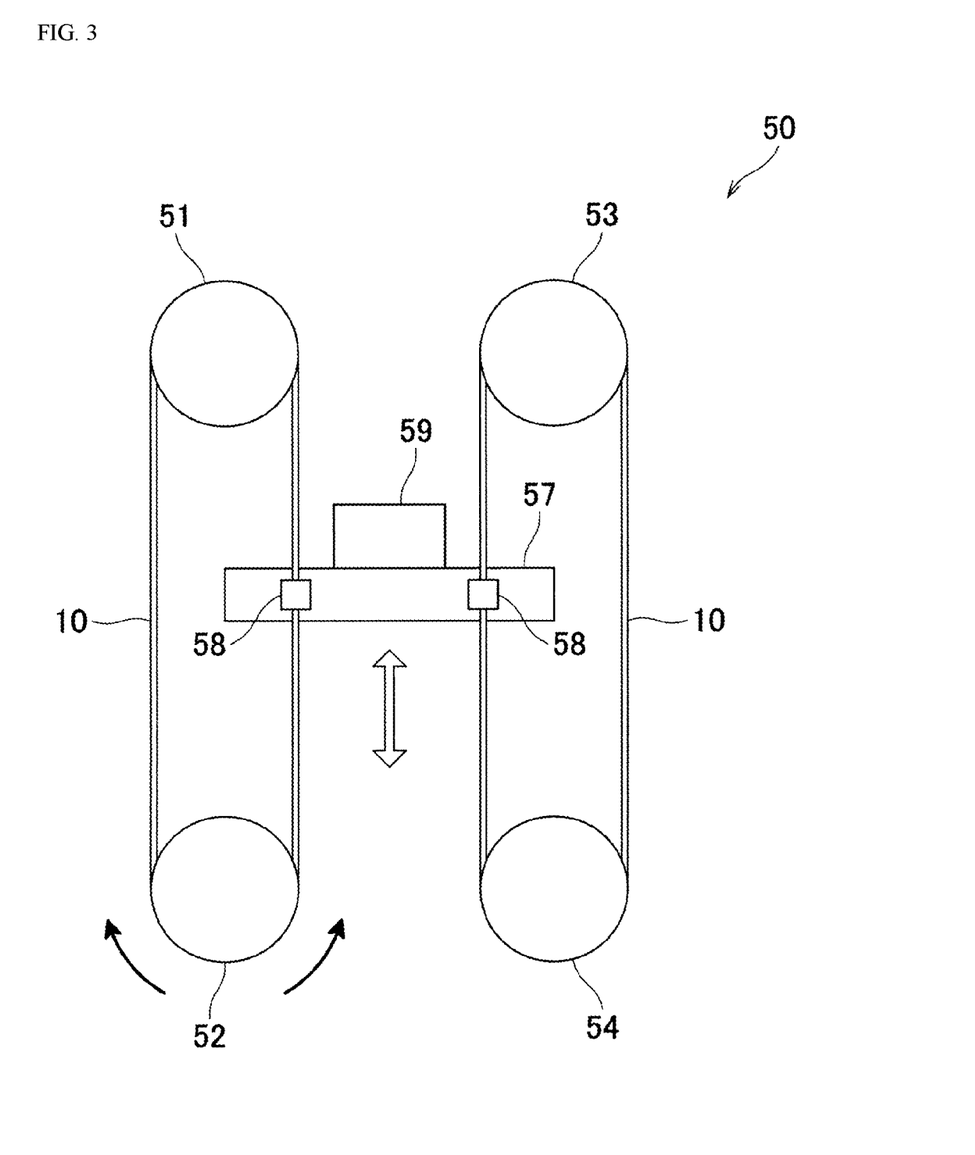
FIG. 3 is a schematic view illustrating an example in which toothed belts according to the embodiment of the present invention are employed to an elevating transport machine.

Belt width W: 50 to 150 mm
Belt total thickness H: 9 to 13 mm
Thickness h2 of the back portion 2: 4 to 6 mm
Height h3 of each tooth 3: 5 to 8 mm
Pitch P of the teeth 3: 20 to 30 mm
Diameter D of each core wire 1: 2.3 to 2.6 mm
Strength of each core wire 1: 7 to 8 kN
Pitch Pt of the core wires 1: 3.0 to 3.7 mm
Interval d between the core wires 1: 0.4 to 1.4 mm (the sum of the intervals d may be 13 to 36% of the belt width W)
Belt strength per 1-mm belt width: 1.85 kN or more and 2.60 kN or less For example, the toothed belt 10 is used in an elevating transport machine 50 as illustrated in FIG. 3.

The elevating transport machine 50 includes toothed pulleys 51 and 53 which are arranged side by side at a top position and toothed pulleys 52 and 54 which are arranged side by side at a bottom position. A toothed belt 10 of open-end is cut into a prescribed width and length, and two end portions in the belt longitudinal direction are fixed to each other with a jig or the like to be endless. The respective resulting belts are wound on the pair of toothed pulleys 51 and 52 and the pair of toothed pulleys 53 and 54, respectively arranged vertically to be opposite to each other. A fixing member 58 for fixing a carrier 57 is attached to each toothed belt 10. Among the four toothed pulleys 51-54, one toothed pulley 52 is driven and the remaining toothed pulleys 51, 53 and 54 are moved synchronously via the toothed belt(s) 10. In the case where the toothed pulley 52 is rotated in the normal direction or the reverse direction in a state that a transport target 59 is put on the carrier 57, the pair of toothed belts 10 are caused to run and the transport target 59 is elevated or lowered vertically.

The toothed belt 10 is preferable for applications to heavy transport targets and can be used in, for example, a use environment in which the weight of the transport target 59 is 5 to 11 t and the maximum tension of 0.20 to 0.25 kN/mm is applied.

The toothed belt according to the present invention may be either an open-end one or an endless one. The toothed belt according to the present invention is not limited to be used in elevating transport machines, and may be used in any machines. Furthermore, the toothed belt according to the present invention may be provided with a reinforcement cloth on the outer circumferential surface and/or the inner circumferential surface of the belt body.

Next, an example of a manufacturing method of the toothed belt 10 will be described.

Figure 4:
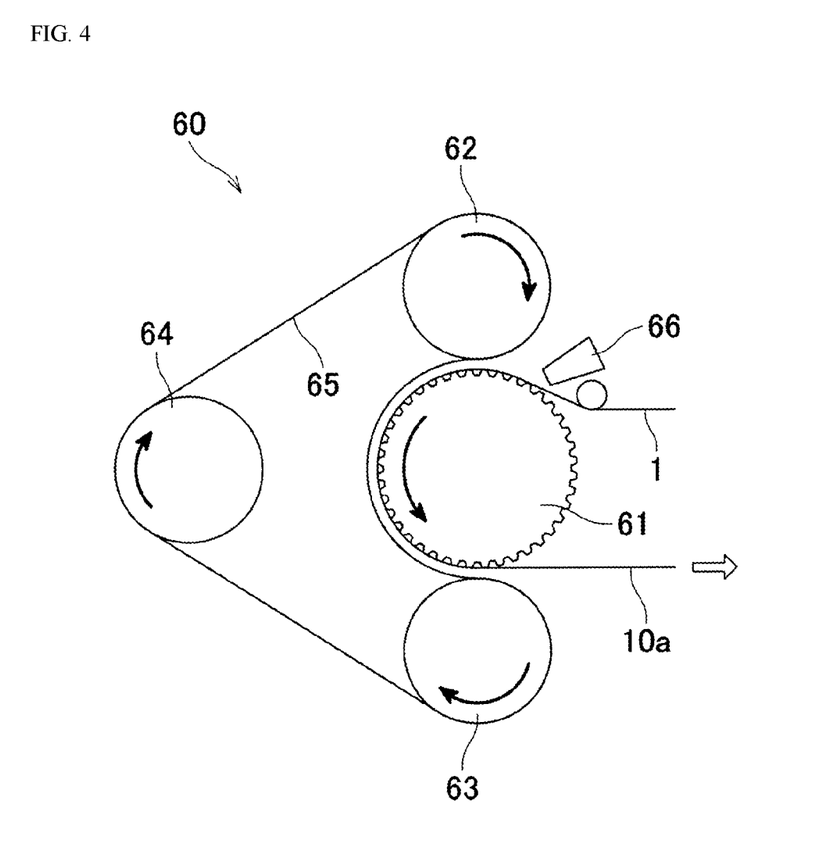
FIG. 4 is a schematic view for description of a manufacturing method of the toothed belt according to the embodiment of the present invention.

For example, the toothed belt 10 is manufactured by a manufacturing machine 60 illustrated in FIG. 4. The manufacturing machine 60 includes a shaping drum 61; pulleys 62 and 63 which are disposed closely over and under the shaping drum 61, respectively; a pulley 64 which is disposed to be opposite to the shaping drum 61 in the horizontal direction; a pressing band 65 which is an endless metal band wound on the pulleys 62-64; an extruding head 66 for extruding thermoplastic elastomer; and a core wire-supplying device (not illustrated).

The outer circumferential surface of the shaping drum 61 is formed with grooves at a prescribed interval in the circumferential direction, for forming the teeth 3. The pulley 64 can be moved in the horizontal direction relative to the shaping drum 61 and applies a prescribed tension to the pressing band 65. The pressing band 65 is disposed so as to be wound on approximately half of the outer circumferential surface of the shaping drum 61, and is pressed against the outer circumferential surface of the shaping drum 61 by the tension applied from the pulley 64.

The extruding head 66 supplies thermoplastic elastomer in a state of being melted by heating, to the outer circumferential surface of the shaping drum 61. The core wire-supplying device (not illustrated) supplies plural core wires 1 arranged in the axial direction of the shaping drum 61 to the outer circumferential surface of the shaping drum 61.

As the shaping drum 61 rotates, the thermoplastic elastomer in the melted state and the plural core wires 1 which are supplied to the outer circumferential surface of the shaping drum 61 are caught between the shaping drum 61 and the pressing band 65. During that course, the grooves formed on the outer circumferential surface of the shaping drum 61 are filled with the thermoplastic elastomer by pressing force of the pressing band 65, and thus the teeth 3 are formed in the respective grooves. Furthermore, during that course, the back portion 2 in which the plural core wires 1 are buried is formed between the outer circumferential surface of the shaping drum 61 and the pressing band 65. The thermoplastic elastomer is cooled and solidified while the thermoplastic elastomer is pressed strongly against the outer circumferential surface of the shaping drum 61 by the pressing force of the pressing band 65. The belt body 10a is taken out continuously at the position where the pressing band 65 leaves the shaping drum 61.

According to the present embodiment, as described above and as will be shown by Examples later, the load-bearing capacity can be increased while keeping the belt width W, whereby the toothed belt 10 that is suitable for application to heavy transport targets can be provided.

In the present embodiment, each core wire 1 is constituted of a steel cord and is 7 to 8 kN in a strength and 2.3 to 2.6 mm in a diameter D. In this case, since a steel cord having features of a low degree of elongation and high strength is used as the core wire 1, necessary increase of the belt strength per unit width can be realized more certainly.

In the present embodiment, the pitch Pt of the core wires 1 is 3.0 to 3.7 mm and the interval d between the core wires 1 is 0.4 to 1.4 mm. In this case, as will be shown by Examples later, increase of the belt strength per unit width can be realized more certainly by selecting a preferred combination of the pitch and the interval of the core wires 1.

EXAMPLES

The present inventors produced toothed belts of Examples 1 to 9 and Comparative Examples 1 to 3 according to the above-described manufacturing method using an AT20 tooth profile (a tooth profile according to ISO 17396: 2014; teeth pitch: 20 mm) and a polyurethane (polyester polyurethane) thermoplastic elastomer, and performed a tension test and a running test on these toothed belts.

The following Tables 1 to 4 show structures of the toothed belts of Examples 1 to 9 and Comparative Examples 1 to 3.

The belt width W of all of the toothed belts of Examples 1 to 9 and Comparative Examples 1 to 3 was set at 135 mm To enable comparison when the pitch P of the teeth 3 or the belt strength per 1-mm belt width was varied, Table 1 shows the structures of the toothed belts of Examples 1 to 3 and Comparative Examples 1 to 3. To enable comparison when the pitch Pt of the core wires 1 was varied from that of the toothed belt of Example 1, Table 2 shows the structures of the toothed belts of Examples 1, 4 and 5. To enable comparison when the hardness was varied from that of the toothed belt of Example 1, Table 3 shows the structures of the toothed belts of Examples 1 and 6 to 8. To enable comparison when the polyurethane type was varied from that of the toothed belt of Example 1, Table 4 shows the structures of the toothed belts of Examples 1 and 9.

TABLE 1

(Comparison in which teeth pitch P or belt strength was varied)

|  |  | Example | | | Comparative Example | | |
| --- | --- | --- | --- | --- | --- | --- | --- |
|  |  | 1 | 2 | 3 | 1 | 2 | 3 |
| Core wire | Diameter D (mm) of each core wire 1 | 2.5 (84 element wires) | | | 1.6 (49 element wires) | | |
|  | Strength (kN) of each core wire 1 | 7.2 | | | 3.0 | | |
|  | Pitch Pt (mm) of core wires 1 | 3.2 | | | 2.2 | | |
|  | Interval d (mm) between core wires 1 | 0.7 | | | 0.6 | | |
|  | Thermoplastic elastomer | Polyester polyurethane | | | | | |
| Belt (Test piece) | Teeth pitch P (mm) | 20 | 25 | 30 | 14 | 20 | 14 |
|  | Tooth height h3 (mm) | 5 | 7.5 | 9.5 | 3.5 | 5 | 3.5 |
|  | Thickness h2 (mm) of back portion | 4 | 5 | 7 | 3.7 | 4 | 3.7 |
|  | Hardness | 90 | | | | | |
|  | Number of core wires | 6 | | | 9 | | |
|  | Strength before running (kN/mm) | 2.20 | 2.21 | 2.23 | 2.19 | 1.48 | 1.46 |
| Running test | Strength after running (kN/mm) | 2.17 | 2.19 | 2.20 | 2.16 | 1.33 | 1.31 |
|  | Strength reduction ratio | 1% | 1% | 1% | 1% | 10% | 10% |
|  | State after running | No defect | No defect | No defect | Tooth chipping | No defect | Tooth chipping |
|  | Positioning failure | None | None | None | None | Occurred | Occurred |
|  | Judgment | A | A | A | D | D | D |

TABLE 2

(Comparison in which pitch Pt of core wires was varied)

|  |  | Example | | |
| --- | --- | --- | --- | --- |
|  |  | 1 | 4 | 5 |
| Core wire | Diameter D (mm) of each core wire 1 | 2.5 (84 element wires) | | |
|  | Strength (kN) of each core wire 1 | 7.2 | | |
|  | Pitch Pt (mm) of core wires 1 | 3.2 | 3.5 | 3.7 |
|  | Interval d (mm) between core wires 1 | 0.7 | 1.0 | 1.2 |
|  | Thermoplastic elastomer | Polyester polyurethane | | |
| Belt (Test piece) | Teeth pitch P (mm) | 20 | | |
|  | Tooth height h3 (mm) | 5 | | |
|  | Thickness h2 (mm) of back portion | 4 | | |
|  | Hardness | 90 | | |
|  | Number of core wires | 6 | 5 | 5 |
|  | Strength before running (kN/mm) | 2.20 | 1.98 | 1.96 |
| Running test | Strength after running (kN/mm) | 2.17 | 1.88 | 1.86 |
|  | Strength reduction ratio | 1% | 5% | 5% |
|  | State after running | No defect | No defect | No defect |
|  | Positioning failure | None | None | None |
|  | Judgment | A | B | B |

TABLE 3

(Comparison in which hardness was varied)

| | | Example | | | |
|---|---|---|---|---|---|
| | | 6 | 7 | 1 | 8 |
| Core wire | Diameter D (mm) of each core wire 1 | 2.5 (84 element wires) | | | |
| | Strength (kN) of each core wire 1 | 7.2 | | | |
| | Pitch Pt (mm) of core wires 1 | 3.2 | | | |
| | Interval d (mm) between core wires 1 | 0.7 | | | |
| | Thermoplastic elastomer | Polyester polyurethane | | | |
| Belt (Test piece) | Teeth pitch P (mm) | 20 | | | |
| | Tooth height h3 (mm) | 5 | | | |
| | Thickness h2 (mm) of back portion | 4 | | | |
| | Hardness | 80 | 85 | 90 | 95 |
| | Number of core wires | 6 | | | |
| | Strength before running (kN/mm) | 2.17 | 2.18 | 2.20 | 2.21 |
| Running test | Strength after running (kN/mm) | 2.15 | 2.15 | 2.17 | 2.18 |
| | Strength reduction ratio | 1% | 1% | 1% | 1% |
| | State after running | Tooth wear | Tooth wear (slight) | No defect | No defect |
| | Positioning failure | None | None | None | None |
| | Judgment | C | B | A | A |

TABLE 4

(Comparison in which polyurethane type was varied)

| | | Example | |
|---|---|---|---|
| | | 1 | 9 |
| Core wire | Diameter D (mm) of each core wire 1 | 2.5 (84 element wires) | |
| | Strength (kN) of each core wire 1 | 7.2 | |
| | Pitch Pt (mm) of core wires 1 | 3.2 | |
| | Interval d (mm) between core wires 1 | 0.7 | |
| | Thermoplastic elastomer | Polyester polyurethane | Polycarbonate polyurethane |
| Belt (Test piece) | Teeth pitch P (mm) | 20 | |
| | Tooth height h3 (mm) | 5 | |
| | Thickness h2 (mm) of back portion | 4 | |
| | Hardness | 90 | |
| | Number of core wires | 6 | |
| | Strength before running (kN/mm) | 2.20 | 2.20 |
| Running test | Strength after running (kN/mm) | 2.17 | 2.18 |
| | Strength reduction ratio | 1% | 1% |
| | State after running | No defect | No defect |
| | Positioning failure | None | None |
| | Judgment | A | A |

Figure 5:
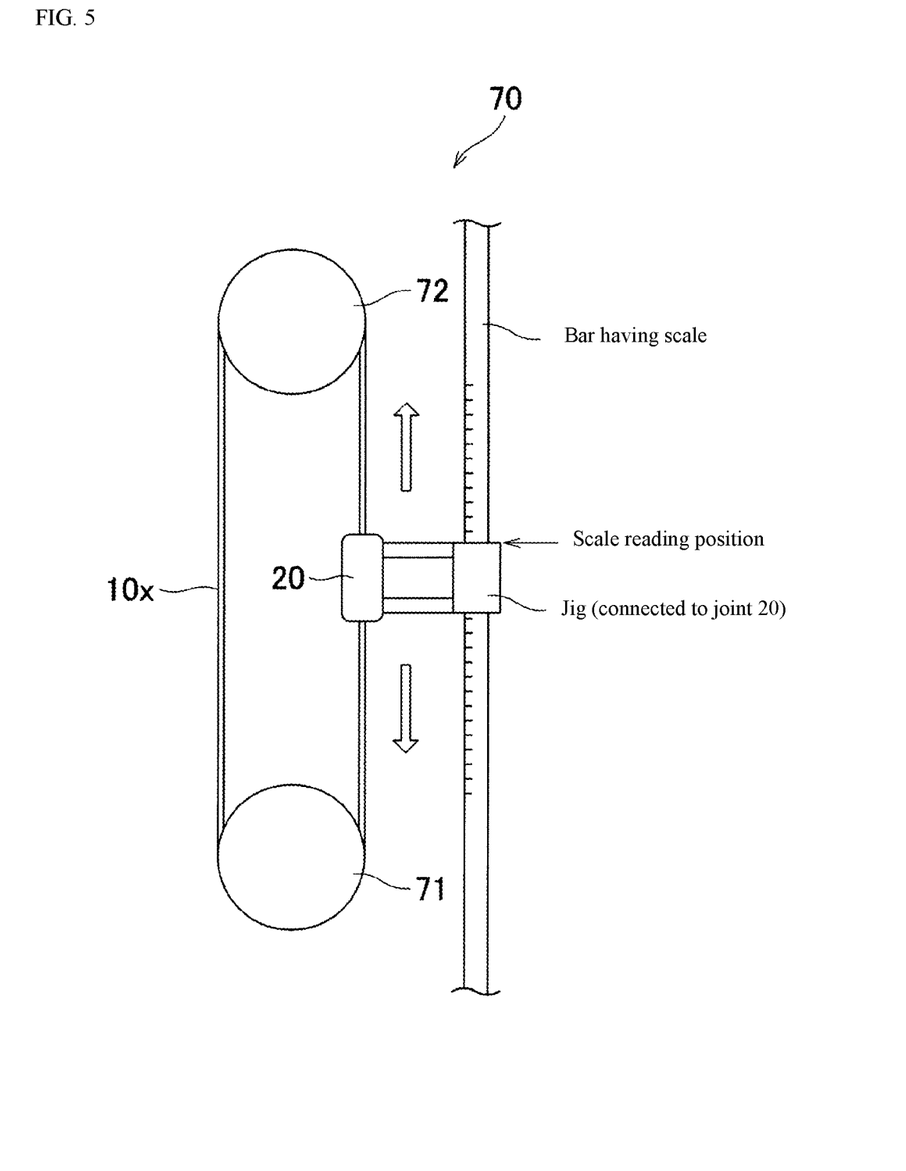
FIG. 5 is a schematic view illustrating a running test machine that was employed in a running test.

In the running test, a test piece 10x having a width 20 mm and a length 3,700 mm was taken from each of the toothed belts of Examples 1 to 9 and Comparative Examples 1 to 3. As illustrated in FIG. 5, two ends of each test piece 10x were connected by a joint 20 to produce an endless toothed belt, which was wound on a drive pulley 71 and a driven pulley 72 (the number of teeth of each of the pulleys 71 and 72 was 32) of an elevation test machine 70. Each test piece 10x was caused to run repeatedly in one million cycles (one cycle corresponds to one reciprocation movement consisted of one forward movement and one reverse movement, illustrated with arrows in FIG. 5) while tension of 0.25 kN/mm was applied thereto.

Strengths of test piece 10x before and after the running test (before running and after running) were measured by a tension test and, furthermore, a reduction ratio of the strength of test piece 10x between before and after the running test was calculated for each test piece 10x. Results are shown in items "strength before running" and "strength after running" of the belt, and in item "strength reduction ratio" of Tables 1 to 4.

In the tension test, a tension test piece having a width 20 mm and a length 500 mm was taken from a test piece 10x before running and a test piece 10x after running that were taken from each of the toothed belts of Examples 1 to 9 and Comparative Examples 1 to 3. And each tension test piece was subjected to a tension test using an Amsler's tension tester (pull rate: 50 mm/min) and strength until the tension test piece broke was measured.

After the running test, each test piece 10x was observed. If a defect such as "tooth chipping" or "tooth wear" was found, the state was entered in item "state after running" of Tables 1 to 4. If no such change was found, "no defect" was entered.

Occurrence of a positioning failure with respect to the drive pulley 71 and the driven pulley 72 was judged for each test piece 10x before and after the running test. More specifically, as illustrated in FIG. 5, a positional deviation was read after the running test by using a jig that is connected to the joint 20. This jig is elevated and lowered along a bar having a scale in link with running (i.e., elevation and lowering of the joint 20) of the belt (i.e., an endless belt formed by joining the two ends of each test piece 10x by the joint 20). A deviation distance between scale reading positions of the jig before the start and after the end of the running test was measured. The case where the deviation distance was smaller than 3 mm was judged that no positional deviation occurred, and the case of larger than or equal to 3 mm was judged that a positional deviation occurred. The case where a positional deviation occurred was judged that a positioning failure "occurred" (item "positioning failure" of Table 1 to Table 4).

Based on the results of the above-described running test, the toothed belts of Examples 1 to 9 and Comparative Examples 1 to 3 were given ranks A to D according to criteria shown below in Table 5. Results were entered in item "judgment" of Table 1 to Table 4.

TABLE 5

| Rank | Judgment criterion |
|---|---|
| A | Belt strength that was higher than or equal to 2.0 kN/mm was maintained even after running and neither a defect such as "tooth chipping" or "tooth wear" nor a positioning failure was found. |
| B | Belt strength that was higher than or equal to 1.85 kN/mm and lower than 2.0 kN/mm was maintained even after running and neither a defect such as "tooth chipping" or "tooth wear" nor a positioning failure was found; or Belt strength that was higher than or equal to 2.0 kN/mm was maintained even after running but a defect such as "tooth chipping" or "tooth wear" was slightly found (at a level that does not affect the durable life). |
| C | Belt strength that was higher than or equal to 2.0 kN/mm was maintained even after running, but a defect such as "tooth chipping" or "tooth wear" was found and hence the durable life is short. |
| D | A defect such as "tooth chipping" or "tooth wear" or a positioning failure was remarkably found to such an extent as to disable practical use. |

The toothed belts of Examples 1 to 3 in which the teeth pitch P was longer than or equal to 20 mm (the teeth pitch P was relatively long and accordingly the tooth scale (the tooth length in the longitudinal direction and the tooth height h3 of the teeth), associated with the teeth pitch P was large) and the strength was high (higher than or equal to 1.85 kN/mm) were all classified as rank A.

Comparative Example 1 was a toothed belt of high in strength but 14 mm in teeth pitch P (i.e., the tooth scale was a little small). Where the tooth scale associated with the teeth pitch P was small, the resistance against effective tension (load) acting on each tooth was lower than in a large scale tooth. Thus, the teeth were prone to be deformed to a large extent and hence a life end was reached early due to tooth chipping, resulting in incapable of practical use (rank D).

Comparative Example 2 was a toothed belt of 20 mm in teeth pitch P (i.e., the tooth scale was large) but lower than 1.85 kN/mm in belt strength because of the use of core wires which were narrower and lower in strength than in Example 1. In this case, because of the narrow core wires, when a heavy load was exerted on the toothed belt, an extremely large tension acted on each core wire, as a result of which the toothed belt was elongated to cause a positioning failure, resulting in incapability of practical use (rank D).

Comparative Example 3 was a toothed belt of 14 mm in teeth pitch P (i.e., the tooth scale was a little small) and lower than 1.85 kN/mm in belt strength. In this case, tooth chipping occurred early and a positioning failure occurred, resulting in incapability of practical use (rank D).

Examples 4 and 5 were toothed belts of the same in structure as that of Example 1 except that the pitch Pt of the core wires was changed (increased) to decrease the number of core wires buried in the toothed belt, and having the teeth pitch P of 20 mm (the tooth was of a large scale). Although the belt strength was lower than in Example 1 because the number of core wires was decreased, belt strength that was higher than or equal to 1.85 kN/mm was maintained even after running and was free of a defect such as "tooth chipping" or "tooth wear" and a positioning failure. As such, it was confirmed that they were capable of practical use (rank B).

Examples 6 to 8 were toothed belts of the same in structure as that of Example 1 except that the hardness of the material (polyurethane thermoplastic elastomer) constituting the toothed belt was changed, and having the teeth pitch P of 20 mm (the tooth was of a large scale). Example 8 in which the hardness was high (95°) was classified as rank A. However, since in the toothed belts being low in hardness, the teeth were prone to wear because of deformation of the teeth, Example 7 (85°) was classified as rank B and Example 6 (80°) was classified as rank C.

Example 9 was a toothed belt of the same in structure as that of Example 1 except that the polyurethane type which is the material (polyurethane thermoplastic elastomer) constituting the toothed belt was changed, and having the teeth pitch P of 20 mm (the tooth was of a large scale). This case was classified as rank A, like in Example 1.

Although the preferred embodiment of the present invention has been described above, the present invention is not limited to the above-described embodiment and can be subjected to various design modifications without departing from the scope of the claims.

The toothed belt according to the present invention may be either an open-end belt or an endless belt. Furthermore, the toothed belt according to the present invention is not limited to be used in elevating transport machines and may be used in any machines.

The thermoplastic elastomer is not limited to a polyurethane thermoplastic elastomer and may be, for example, a polyester thermoplastic elastomer, a polystyrene thermoplastic elastomer, a polyolefin thermoplastic elastomer, a polyamide thermoplastic elastomer, a vinyl chloride thermoplastic elastomer, or the like, or a combination of two or more thereof.

The harness of the thermoplastic elastomer is not limited to 85 to 95° and may be out of this range.

The core wire is not limited to be constituted of a steel cord and may be constituted of, for example, a cord produced by twisting aramid fibers or carbon fibers.

A reinforcement cloth may be provided on the outer circumferential surface and/or the inner circumferential surface of the belt body.

The present application is based on Japanese Patent Application No. 2017-085025 filed on Apr. 24, 2017 and Japanese Patent Application No. 2018-079008 filed on Apr. 17, 2018, the disclosures of which are incorporated herein by reference.

REFERENCE SIGNS LIST

1: Core wire
2: Back portion
3: Tooth
10: Toothed belt
10a: Belt body
d: Interval between core wires
D: Diameter of core wire
h2: Thickness of back portion
h3: Height of tooth
P: Pitch of teeth
Pt: Pitch of core wires

The invention claimed is:
1. A toothed belt comprising a belt body comprising plural core wires that extend in a belt longitudinal direction and are arranged in a belt width direction, a back portion in which the plural core wires are buried, and plural teeth that are opposite to the back portion in a belt thickness direction and arranged in the belt longitudinal direction so as to be spaced from each other, wherein the back portion and the plural teeth are molded integrally of a thermoplastic elastomer, having:

- a belt strength per 1-mm belt width higher than or equal to 1.85 kN;
- a pitch of the plural teeth longer than or equal to 20 mm;
- a height of each of the plural teeth greater than or equal to 5 mm; and
- a thickness of the back portion larger than or equal to 4 mm, wherein each of the plural core wires has a strength of 7 to 8 kN, and the plural core wires have a pitch of 3.0 to 3.7 mm and an interval of 0.4 to 1.4 mm.

2. The toothed belt according to claim 1, wherein each of the plural core wires is constituted of a steel cord or a cord produced by twisting at least any of aramid fibers and carbon fibers.

3. The toothed belt according to claim 1, wherein each of the plural core wires:
   is constituted of a steel cord; and
   has a diameter of 2.3 to 2.6 mm.

4. The toothed belt according to claim 1, wherein the thermoplastic elastomer is at least one selected from the group consisting of: a polyurethane thermoplastic elastomer; a polyester thermoplastic elastomer; a polystyrene thermoplastic elastomer; a polyolefin thermoplastic elastomer; a polyamide thermoplastic elastomer; and a vinyl chloride thermoplastic elastomer.

5. The toothed belt according to claim 1, wherein the thermoplastic elastomer is a polyurethane thermoplastic elastomer and has a hardness of 85 to 95°.

* * * * *